United States Patent
Pak et al.

(10) Patent No.: US 10,577,075 B1
(45) Date of Patent: Mar. 3, 2020

(54) INTERLOCKING DEVICE FOR AIRCRAFT COCKPIT FRAMES

(71) Applicants: Charles Pak, Fullerton, CA (US); Brandon T. Keller, Lake Forest, CA (US)

(72) Inventors: Charles Pak, Fullerton, CA (US); Brandon T. Keller, Lake Forest, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 288 days.

(21) Appl. No.: 15/585,496

(22) Filed: May 3, 2017

(51) Int. Cl.
 *B64C 1/14* (2006.01)
 *B64D 7/00* (2006.01)

(52) U.S. Cl.
 CPC .............. *B64C 1/1492* (2013.01); *B64D 7/00* (2013.01)

(58) Field of Classification Search
 CPC ........................... B64C 1/1492; B64C 1/1476

USPC .......................................................... 244/131
See application file for complete search history.

(56) References Cited

U.S. PATENT DOCUMENTS

| 2,443,751 | A | * | 6/1948 | Terepin | ................. | B64C 1/1476 |
| | | | | | | 220/378 |
| 2,716,529 | A | * | 8/1955 | Czerwinski | ........... | B64C 1/1476 |
| | | | | | | 244/121 |
| 2015/0298787 | A1 | * | 10/2015 | Nordin | ...................... | B64C 3/28 |
| | | | | | | 244/45 R |

* cited by examiner

*Primary Examiner* — Nicholas McFall
*Assistant Examiner* — Terri L Filosi
(74) *Attorney, Agent, or Firm* — Tarolli, Sundheim, Covell & Tummino LLP

(57) ABSTRACT

An apparatus for connecting a windscreen and a canopy to an aircraft is provided that includes a first frame for securing to the windscreen and a second frame for securing to the canopy. At least one movable joint connects the first frame to the second frame. The at least one movable joint deforms in response to an object striking at least one of the windscreen and the canopy to allow for relative movement between the first and second frames.

24 Claims, 7 Drawing Sheets

US 10,577,075 B1

INTERLOCKING DEVICE FOR AIRCRAFT COCKPIT FRAMES

TECHNICAL FIELD

The present disclosure relates generally to aircraft and, more specifically relates to movable joints between frames for an aircraft windscreen and canopy.

BACKGROUND

Pilots seated in aircraft cockpits are protected from exterior conditions, e.g., weather, objects in the sky, by one or more durable, optically transparent covers. This can include a windscreen and a canopy that is movable relative to the windscreen to allow for pilot ingress and egress. The windscreen and canopy are connected to the aircraft fuselage by a unitary frame, which must absorb the impact of any object(s) striking the windscreen and/or canopy. The cross-section of the frame is typically increased to help it absorb the full impact load.

SUMMARY

In accordance with one example, an apparatus for connecting a windscreen and a canopy of an aircraft is provided that includes a first frame for securing to the windscreen and a second frame for securing to the canopy. At least one movable joint connects the first frame to the second frame. The at least one movable joint plastically deforms in response to an object striking at least one of the windscreen and the canopy to allow for relative movement between the first and second frames.

In another example, an apparatus for connecting a windscreen and a canopy to an aircraft includes a first frame for securing to the windscreen and a second frame for securing to the canopy. A sliding joint includes a first seal secured to the second frame and a recessed surface on the first frame on which the first seal slides to allow for relative fore-aft movement between the first and second frames. A compression joint includes a second seal secured to the first frame and a cavity provided on the second frame for receiving the second seal to allow for relative fore-aft movement between the first and second frames. At least one of the first and second joints deforms in response to an object strike of at least one of the windscreen and the canopy to allow for relative movement between the first and second frames until the first and second frames abut one another.

Other objects and advantages and a fuller understanding of the disclosure will be had from the following detailed description and the accompanying drawings.

DETAILED DESCRIPTION

Figure 1:
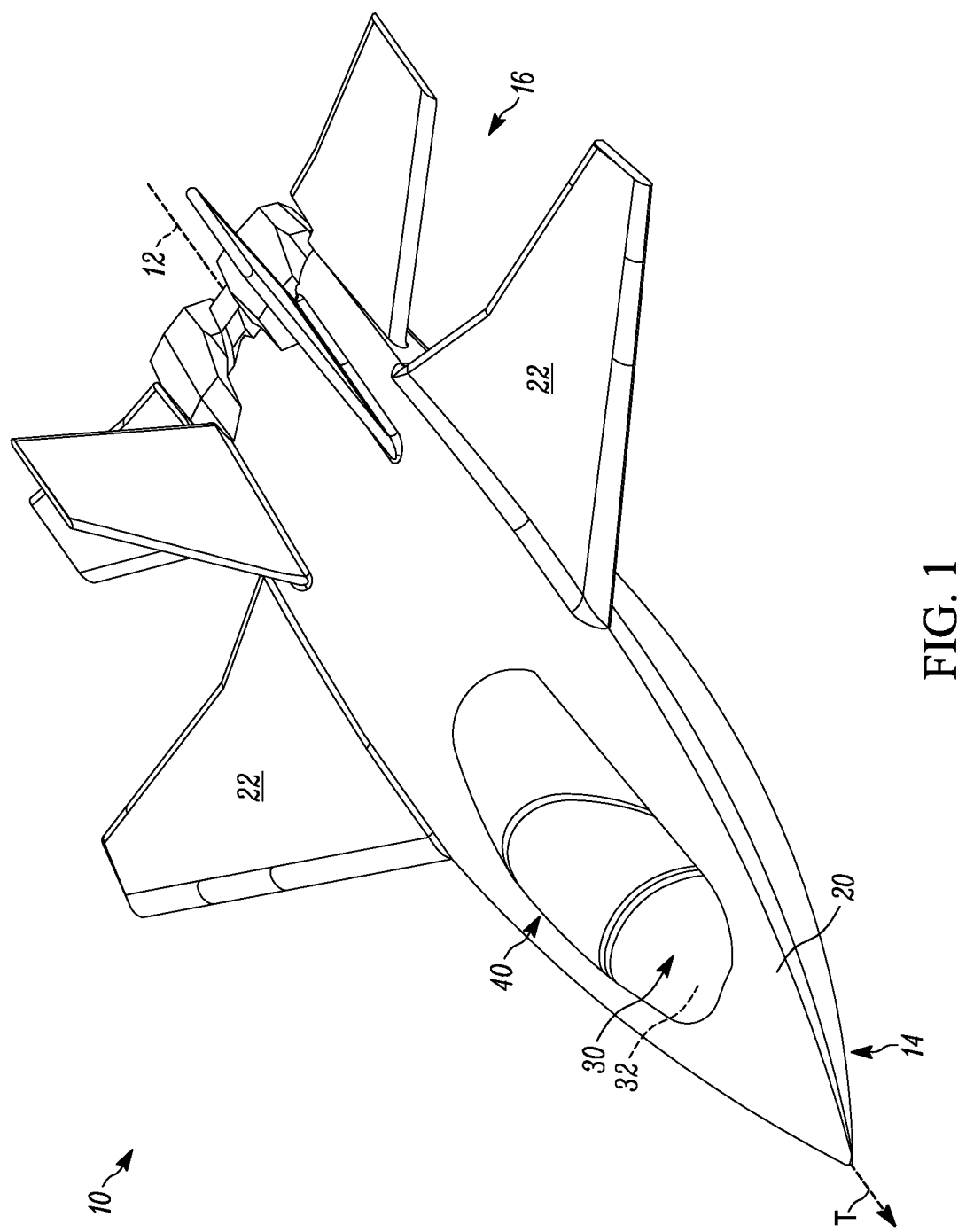
FIG. 1 illustrates an aircraft including a windscreen and a canopy.
Figure 2:
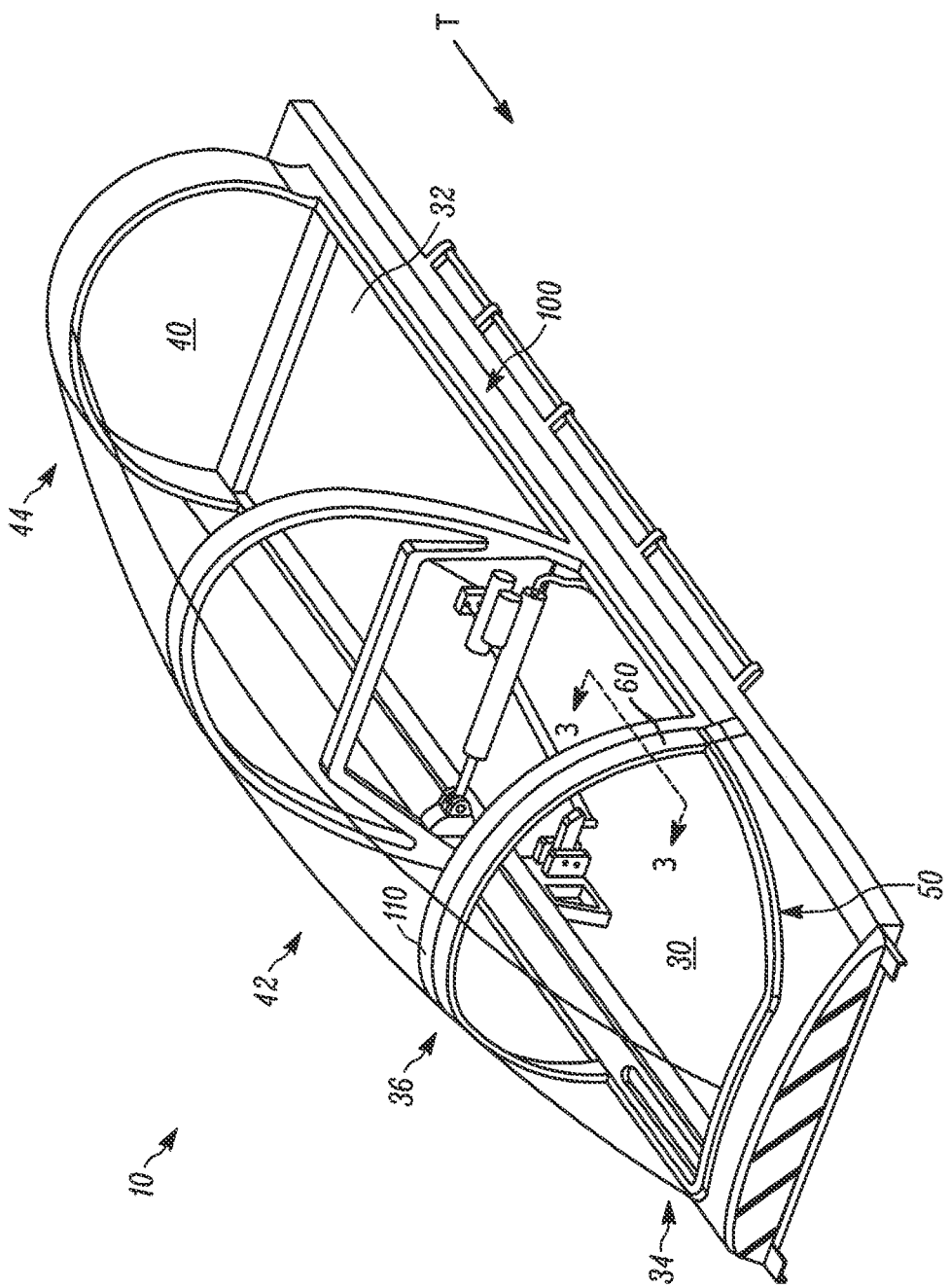
FIG. 2 illustrates an enlarged view of a portion of FIG. 1 illustrating first and second cockpit frames for the windscreen and canopy.
Figure 3:
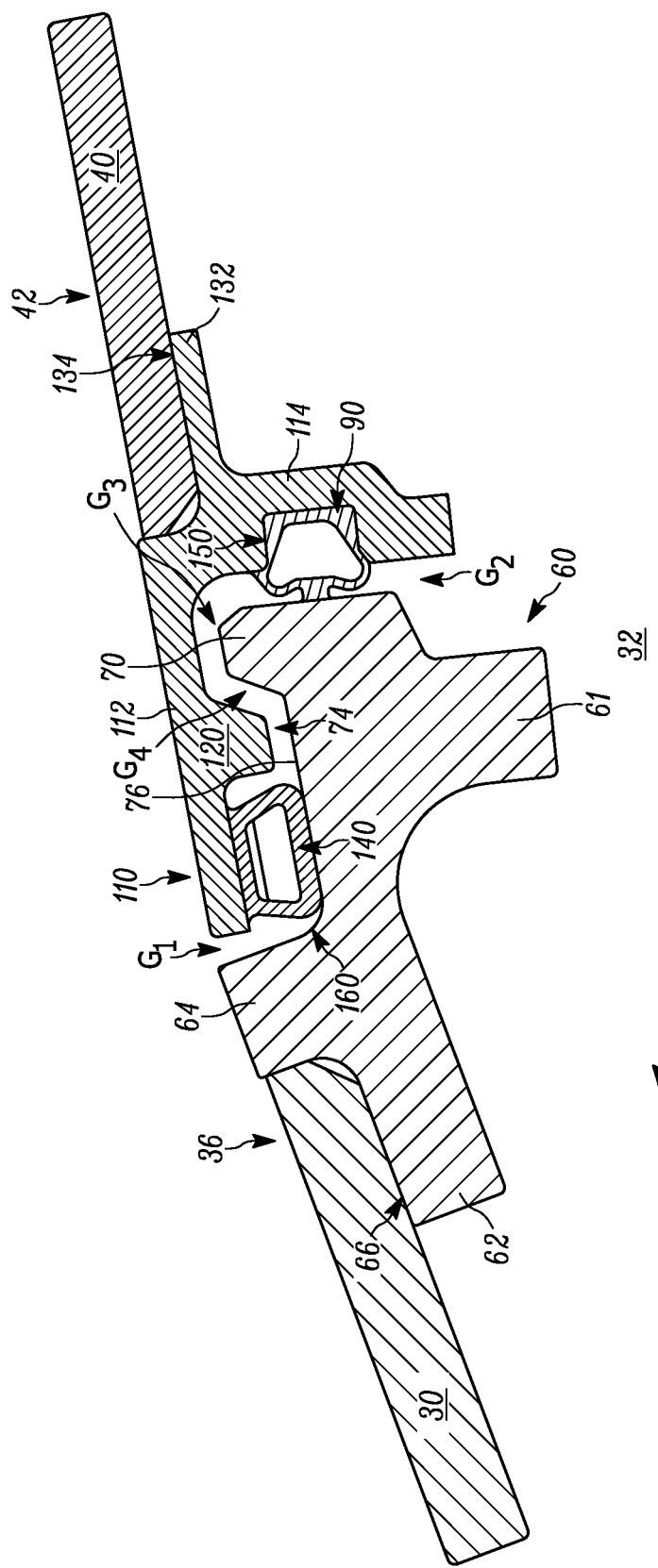
FIG. 3 is a section view of FIG. 2 taken along line 3-3 illustrating a pair of frame joints in accordance with the present disclosure.

The present disclosure relates generally to aircraft and, more specifically relates to movable joints between frames for an aircraft windscreen and canopy. It will be appreciated that any and all directional adjectives, e.g., downward, forward, vertical, etc., are indicative of the referenced figure and will necessarily change when the aircraft is in flight. FIGS. 1-3 illustrate an aircraft 10 including a pair of movable joints 150, 160 in accordance with an embodiment of the present disclosure. Referring to FIG. 1, the aircraft 10 constitutes a fixed wing plane and extends generally along a centerline 12 from a first or fore end 14 to a second or aft end 16. The centerline 12 extends generally along a direction of travel, indicated by the arrow T.

The aircraft 10 includes a fuselage 20 that extends along the centerline 12. A pair of fixed wings 22 extends from the fuselage 20 on opposite sides of the centerline 12. The fuselage 20 defines a cockpit 32 for the pilot (not shown) and controls (not shown) for flying the aircraft 10. The cockpit 32 is enclosed by a combination of the fuselage 20, a windscreen 30, and a canopy 40 connected to the windscreen. The cockpit 32 is pressurized during flight and, thus, the windscreen 30 and canopy 40 help seal the cockpit 32. Both the windscreen 30 and canopy 40 are rounded to help deflect any object impacting the same during flight.

Referring to FIG. 2, the canopy 40 is movable relative to the fuselage 20 in a known manner, e.g., pivotal movement towards the aft end 16, for pilot entry/egress. The windscreen 30 and canopy 40 can each be formed from a lightweight, durable, optically transparent material, such as acrylic. The windscreen 30 is secured to a frame 50 on the fuselage 20. The canopy 40 is secured to a frame 60 on the fuselage 20, which can be formed as part of the frame 50 or separate therefrom.

A pair of frames 60, 110 is connected to or formed as part of the frames 50 and 100, respectively. Each frame 60, 110 extends over the cockpit 32. In one example, the frames 60, 110 are arc-shaped and secured to the windscreen 30 and the canopy 40, respectively. A first end 34 of the windscreen 30 is secured to the frame 50 closer to the front 14 of the aircraft 10. A second end 36 of the windscreen 30 is secured to the frame 60. Similarly, a first end 42 of the canopy 40 is secured to the frame 110. A second end 44 of the canopy 40 is secured to the frame 100 closer to the rear 16 of the aircraft 10.

Figure 4:
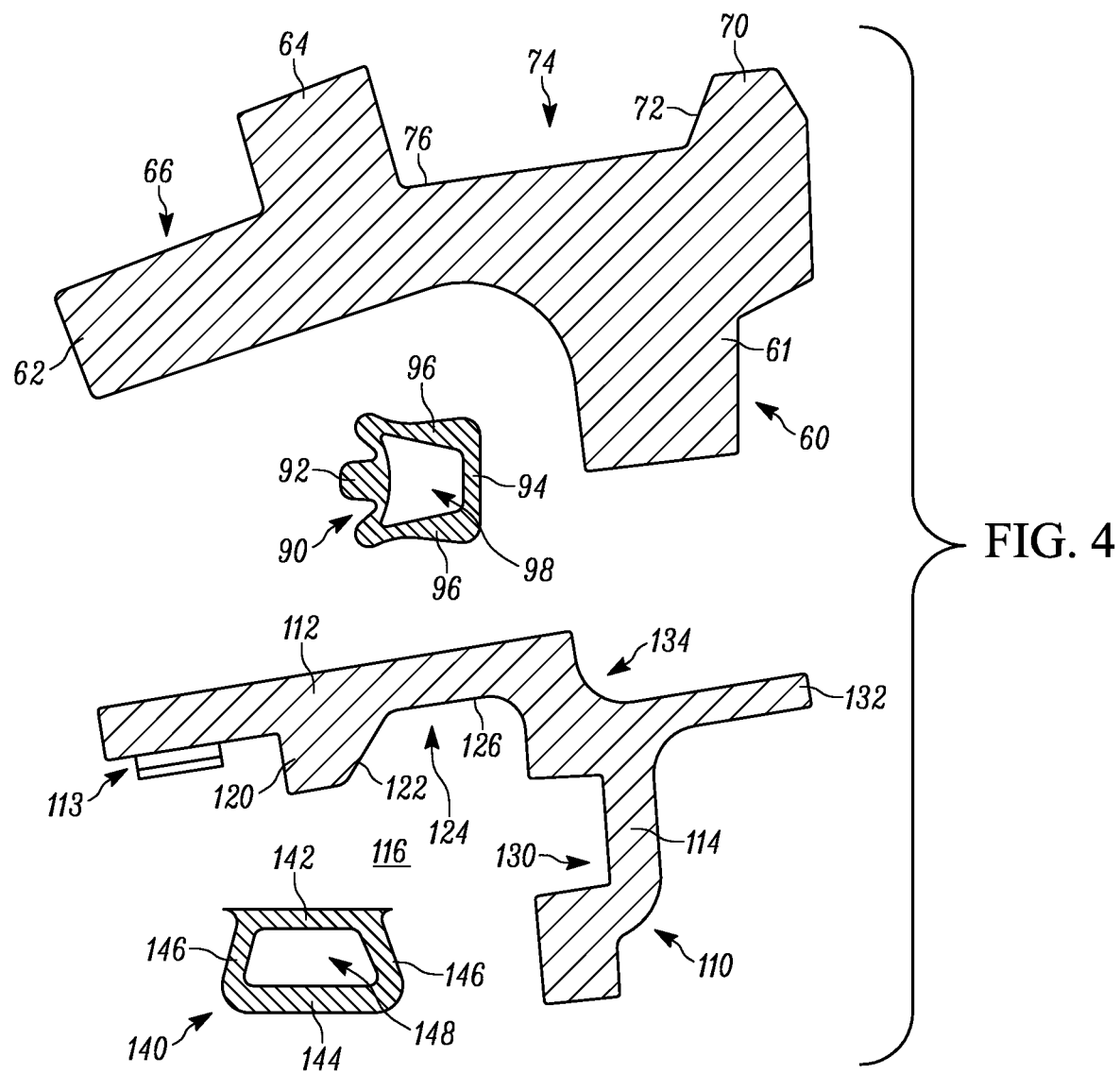
FIG. 4 is an exploded view of portions of FIG. 3.

Referring to FIGS. 3-4, the frame 60 is formed from aluminum, steel or a composite material suitable for flight. A downward portion 61 of the frame 60 is directly connected to the frame 50. A support member 62 extends forward of the frame 60. The support member 62 can have a generally rectangular shape with a downward (as shown) curvature that mimics the trajectory of the windscreen 30. A first projection 64 extends at an angle, e.g., perpendicular, from the support member 62. The support member 62 and first projection 64 cooperate to define a shelf 66 for receiving the second end 36 of the windscreen 30. The windscreen 30 can be secured to the shelf 66 via adhesive, fasteners, etc., such that the windscreen and frame 60 are rigidly fixed together.

A second projection 70 extends from the frame 60 and includes an angled surface 72. The second projection 70 is spaced from the first projection 64 to define a recess 74 therebetween. A recessed surface 76 extends between the projections 64, 70 and defines the depth of the recess 74.

A seal 90 extends rearward from the frame 60 and is formed from a flexible material, e.g., rubber. The seal 90 includes a base 92 fixed to the frame 60, a connecting element 94, and a pair of arms 96 extending from the base to the connecting element. A passage 98 extends between the arms 96. The passage 98 receives pressurized fluid (not shown) for inflating the seal 90 in order to seal the pressurized cockpit 32 from the aircraft 10 exterior.

The frame 110 is formed from an aluminum, steel or composite material suitable for flight. The frame 110 includes a pair of arms 112, 114 extending at an angle, e.g., substantially perpendicular, from one another. The arm 114 is directly connected to the frame 110. A space 116 is generally defined between the arms 112, 114. A projection 120 extends downward from the arm 112 into the space 116 and includes an angled surface 122. The surface 122 has the same angle of inclination as the angled surface 72 on the frame 60. The projection 120 is spaced from the arm 114 to define a recess 124 therebetween. A recessed surface 126 extends between the arm 114 and the projection 120 and helps define the depth of the recess 124.

A cavity 130 is formed in the arm 114 and faces the space 116. The cavity 130 is sized and shaped to receive the connecting element 94 on the seal 90. The connecting element 94 can be rigidly secured to the arm 114 within the cavity 130 via fastener, adhesive, friction-fit, etc. The seal 90 and cavity 130 cooperate to define the movable joint 150 connecting the frames 60, 110 to one another.

A support member 132 extends rearward of the arm 114. The support member 132 can have a generally rectangular shape with a curvature mimicking the trajectory of the canopy 40. The support member 132 cooperates with the arm 112 to define a shelf 134 for receiving the first end 42 of the canopy 40. The canopy 40 can be secured to the shelf 134 via adhesive, fastener, etc. such that the canopy and frame 110 are rigidly fixed together.

A seal 140 extends downward from the arm 112 into the space 116. The seal 140 is formed from a flexible material, e.g., rubber. The seal 140 includes a base 142 fixed to the arm 112, a connecting element 144, and a pair of flexible arms 146 extending from the base to the connecting element. In one example, the base 142 extends through a passage 113 provided in the arm 112, but may be connected to the arm in other manners. A passage 148 extends between the arms 146. The connecting element 144 slidably engages the surface 76 on the frame 60. The seal 140 and surface 76 cooperate to define the movable joint 160 slidably connecting the frames 60, 110 to one another and also acts as a weather seal for the interface between the frames 60, 110 to prevent rain from entering the cockpit 32.

Referring to FIG. 3, the frame 110 is contoured and secured/connected to the frame 100 such that, when the first end 42 of the canopy 40 is secured to the frame 110, the frame floats over or is spaced from the frame 60 at multiple locations. In other words, the frames 60, 110 do not initially abut or engage one another but instead are separated by multiple gaps $G_1$-$G_3$. In one example, a gap $G_1$ extends between the projection 64 and the arm 112 in the fore-aft direction of the aircraft 10. A gap $G_2$ extends between the frame 60 and the arm 114 in the fore-aft direction of the aircraft 10 and is substantially equal in fore-aft length to the gap $G_1$. A gap $G_3$ extends vertically between the arm 112 and the projection 70 and extends between the projection 120 and the surface 76 in the fore-aft direction. A gap $G_4$ extends in the fore-aft direction between the projection 70 on the frame 60 and the projection 120 on the frame 110.

The gaps $G_1$-$G_4$ allow the frames 60, 110 to be movable relative to one another in response to an object striking the windscreen 30 and/or canopy 40. The joints 150, 160 span one or more of the gaps $G_1$-$G_4$ and can compress, collapse, expand and/or deform in response to the relative movement between the frames 60, 110, which can ultimately close one or more of the gaps $G_1$-$G_4$. The seals 90, 140 in the joints 150, 160 maintain air pressure within the cockpit 32 and prevent weather from entering the cockpit before, during, and after relative movement between the frames 60, 110.

Once one or more of the gaps $G_1$-$G_4$ is completely closed, the frames 60, 110 abut one another in an interlocking manner and thereafter act in unison as a rigid, unitary structure to absorb further impact from the object strike. In other words, the frames 60, 110 initially respond to the object strike in a more flexible/forgiving manner by moving relative to one another as joints 150, 160 deform. Eventually, the joints 150, 160 deform until the frames 60, 110 abut one another, relative movement between the frames ceases, and the frames thereafter absorb further object impact forces as a single, rigid structure.

More specifically, as the two frames 60, 110 come into contact they are able to start "sharing" the load with one another due to the interlocking feature. To this end, the cross-section areas and moment of inertias of the individual frames 60, 110 is much smaller than if the two frames act as a single unit. The moment of inertia and polar moment of inertia (torsional stiffness) of the combined frames 60, 110 via the interlocking feature then increases the structural rigidity of the system, which reduces the frame deflection upon impact scenarios. This can help prevent object penetration into the cockpit 32 or extreme frame 60, 110 deflections that can impact the pilots head/helmet and increase the overall safety to the air crew.

Figure 5A:
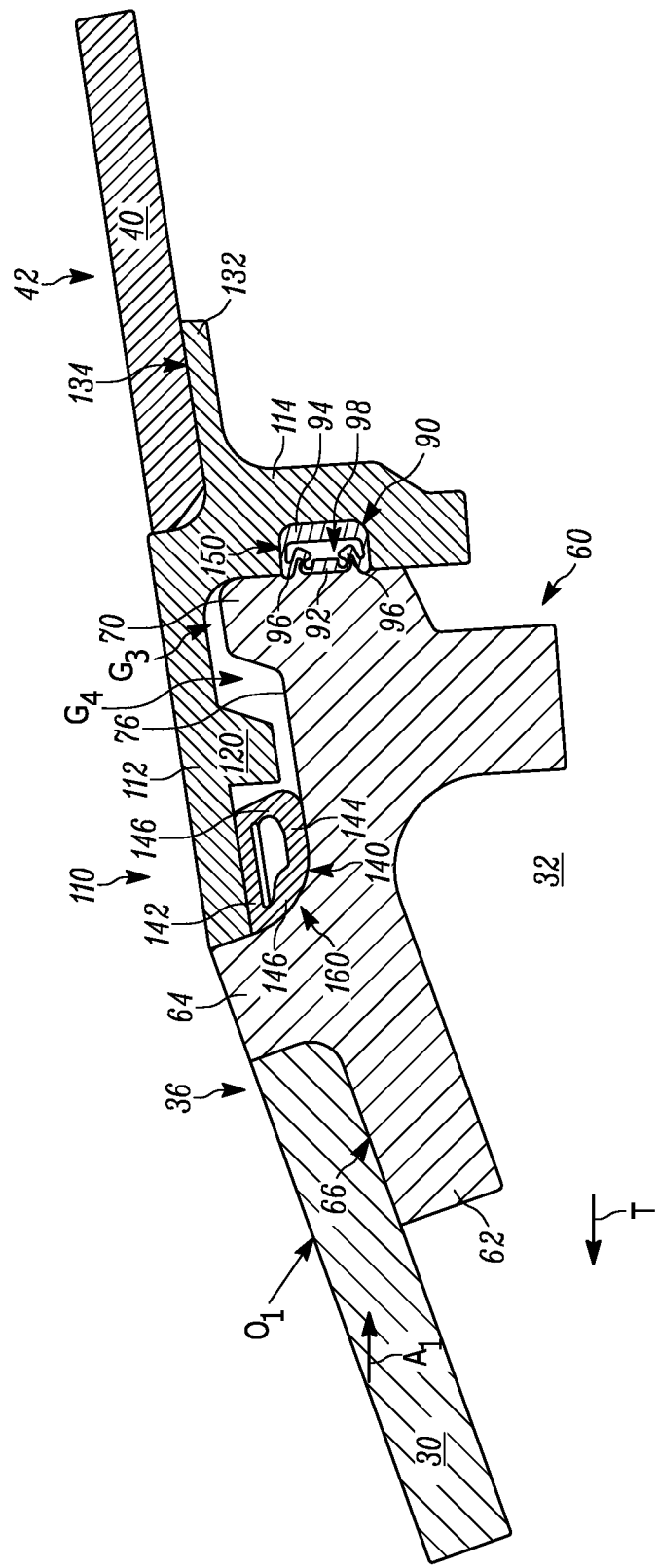
FIG. 5A is a schematic illustration of relative fore-aft movement between the first and second frames.

In one example shown in FIG. 5A, when the aircraft 10 is traveling in the direction T and impacts an object, e.g., a bird, in a head-on manner indicated generally at $O_1$, the windscreen 30 is urged in the direction $A_1$ opposite to the direction of travel T. The impact force is transferred from the windscreen 30 to the frame 60 fixed thereto. This causes the frame 60 to urge the base 92 of the seal 90 towards the passage 98 until the pressure within the passage 98 is overcome, causing the arms 96 to deform. This allows the base 92 to move towards the connecting element 94 and thereby constrict/close the passage 98. The joint 150 therefore closes or collapses to allow the frame 60 to move towards and relative to the frame 110 in the direction $A_1$.

The frame 60 moves in the direction $A_1$ until the first projection 64 comes to a hard stop against the arm 112 on the frame 110, i.e., the gap $G_1$ is closed to zero. At the same time, the frame 60 can come to a hard stop against the arm 114 on the frame 110, i.e., the gap $G_2$ is closed to zero. The gaps $G_3$ and $G_4$ remain. In any case, the joint 150 collapses or closes on itself to allow for relative fore-aft movement between the frames 60, 110 until the frames engage one another and thereafter absorb the head-on impact from the object by acting as a rigid, unitary structure.

While the joint 150 is closing, the seal 140 slides along the surface 76 and maintains an abutting interface therewith. Depending on the spacing between and sizing of the projection 64, the arm 112, and the seal 140, the seal 140 may be laterally compressed by the moving projection (as shown). Alternatively, the seal 140 can laterally slide but is not deformed (not shown) when the frames 60, 110 abut one another. Regardless of how the seal 140 responds to the object strike, the seal 140 maintains the weather sealing functionality across the frame 60, 110 interface before, during, and after the object strike.

The joints 150, 160 allow the frames 60, 110 to move relative to one another when the windscreen 30 is impacted in the manner $O_1$ to advantageously share the impact load. More specifically, the joints 150, 160 share the object impact load and allow the frames 60, 110 to move relative to one another in the direction $A_1$ to initially absorb the impact before the frames abut one another and thereafter rigidly absorb the impact. The frames 60, 110 maintain an abutting interface following relative movement therebetween to prevent the impact object from penetrating the interface between the frames and entering the cockpit 32.

In another example, the aircraft 10 impacts the object from below and at a steep angle in the manner indicated generally at $O_2$ in FIG. 5B. When this occurs, the canopy 40 is urged in the direction $A_2$, and the impact force is transferred from the canopy to the frame 110 fixed thereto. This causes the frame 110 to urge the base 142 of the seal 140 towards the surface 76 on the frame 70 until the arms 146 deform, which allows the base to move towards the surface and thereby constrict/close the passage 148. The base 142 moves in the direction $A_2$ until the projection 120 comes to a hard stop against the surface 76. At the same time, the arm 112 may come to a hard stop against the projection 70, i.e., the gap $G_3$ is closed to zero. The gaps $G_1$, $G_2$, $G_4$ remain. In any case, the joint 160 collapses or closes on itself to allow for relative vertical movement between the frames 60, 110 until the frames engage one another in an interlocking manner and thereafter absorb the impact from the object by acting as a rigid, unitary structure.

While the joint 160 closes, the downward moving frame 110 causes the arms 96 on the seal 90 to deform since the seal 90 maintains a connection between the frames 60, 110. That said, both seals 90, 140 maintain their functionality before, during, and after the impact in the manner $O_2$. The joints 150, 160 allow the frames 60, 110 to move relative to one another when the windscreen 30 is impacted in the manner $O_2$ to advantageously share the impact load. More specifically, the joints 150, 160 share the object impact load and allow the frames 60, 110 to move relative to one another in the direction $A_2$ to initially absorb the impact before the frames abut one another and thereafter rigidly absorb the impact. The frames 60, 110 maintain an abutting interface following relative movement therebetween to prevent the impact object from penetrating the interface between the frames and entering the cockpit 32.

In another example, the aircraft 10 impacts the object from below and at a shallower angle in the manner indicated generally at $O_3$ in FIG. 5C. When this occurs, the canopy 40 is urged in both the direction $A_2$ and the aft direction $A_3$, and the impact force is transferred from the canopy to the frame 110 fixed thereto. This causes the frame 110 to urge the base 142 of the seal 140 towards the surface 76 on the frame 70 until the arms 146 deform, which allows the base to move towards the surface and thereby constrict/close the passage 148. The base 142 moves in the direction $A_2$ until the projection 120 comes to a hard stop against the surface 76. At the same time, the arm 112 may come to a hard stop against the projection 70, i.e., the gap $G_3$ is closed to zero. In any case, the joint 160 closes or collapses to allow the frame 110 to move towards and relative to the frame 60 in the direction $A_2$ to allow for relative vertical movement between the frames 60, 110.

While the joint 160 collapses, the downward moving frame 110 causes the arms 96 on the seal 90 to deform since the seal 90 maintains a connection between the frames 60, 110. Since the frame 110 also moves in the direction $A_3$, the connecting member 94 is moved away from the base 92 secured to the frame 60. Consequently, the seal 90 is also stretched or expanded in the aft direction $A_3$ by the moving frame 110 in response to the object impact $O_3$. The frame 110 moves in the aft direction $A_3$ relative to the frame 60 until the projection 120 comes to a hard stop against the projection 70, i.e., the gap $G_4$ is closed to zero. The gaps $G_1$, $G_2$ remain. In any case, the joint 150 expands to allow the frame 110 to move in the aft direction relative to the frame 60 in the direction $A_3$ to allow for relative aft movement between the frames 60, 110.

Both seals 90, 140 maintain their functionality before, during, and after the impact in the manner $O_3$. The joints 150, 160 allow the frames 60, 110 to move relative to one another in both the vertical direction and the fore/aft direction when the canopy 40 is impacted in the manner $O_3$ to advantageously share the impact load. More specifically, the joints 150, 160 share the object impact load and allow the frames 60, 110 to move relative to one another in the direction $A_2$ and in the direction $A_3$ to initially absorb the impact before the frames abut one another and thereafter rigidly absorb the impact by acting as a rigid, unitary structure. The frames 60, 110 maintain an abutting interface following relative movement therebetween to prevent the impact object from penetrating the interface between the frames and entering the cockpit 32.

Figure 5B:
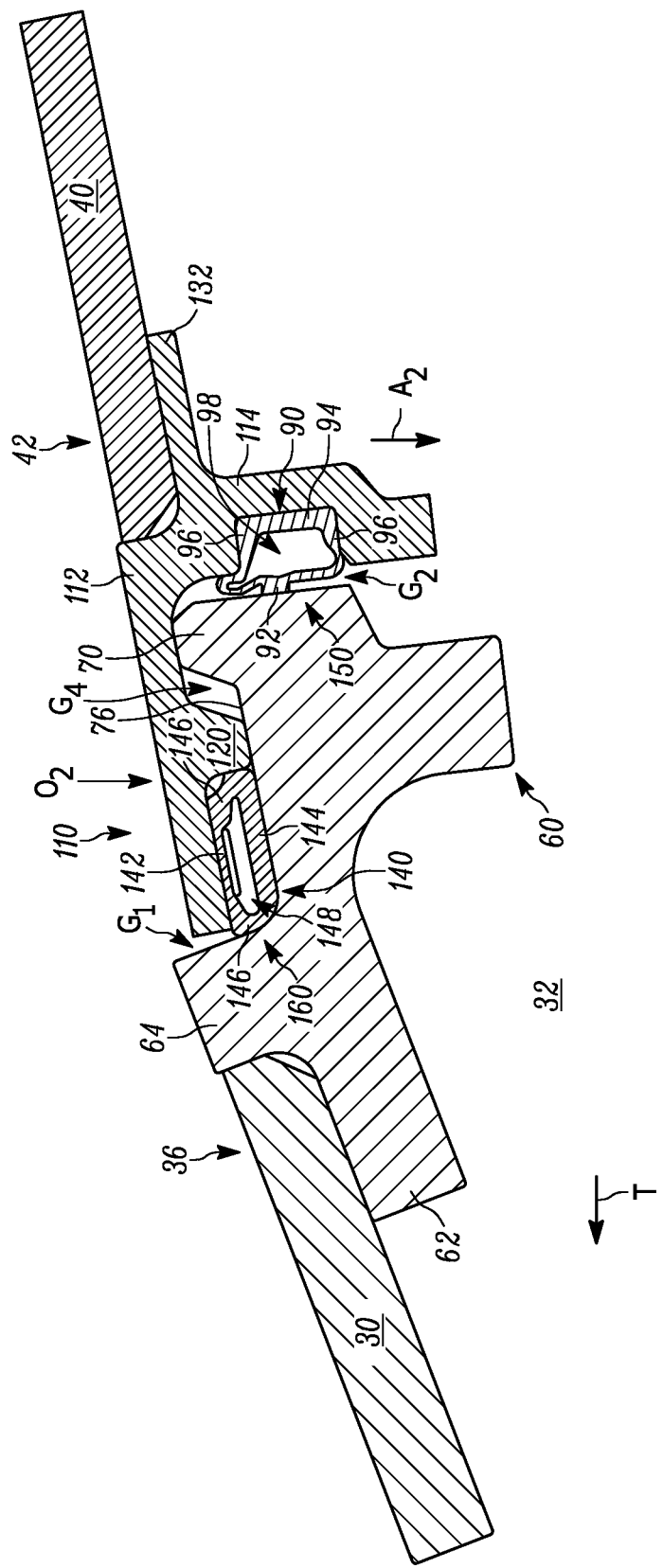
FIG. 5B is a schematic illustration of relative vertical movement between the first and second frames.
Figure 5C:
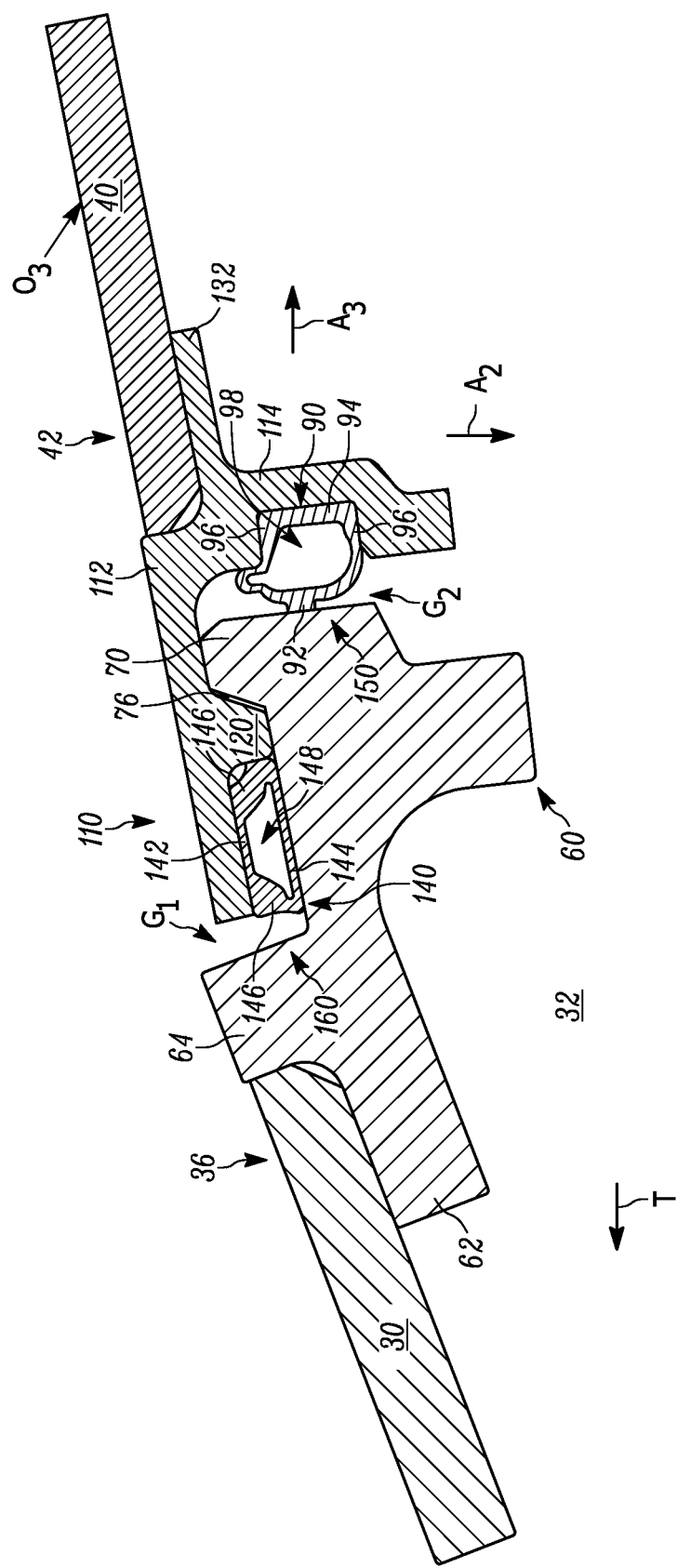
FIG. 5C is a schematic illustration of relative vertical movement and relative aft movement between the first and second frames.

Although FIGS. 5A-5C show the object impacting only the windscreen 30 or only the canopy 40 in the respective manners $O_1$-$O_3$, it will be appreciated that an object can impact both components 30, 40 along their interface. Furthermore, depending on the angle at which the object strikes the windscreen 30 and/or canopy 40, one or both joints 150, 160 can collapse/close to allow the frames 60, 110 to share the load of the impact between the moving frames 60, 110 and thereby prevent the struck object from entering the cockpit 32. That said, the joints 150, 160 as shown provide movable, interlocking interfaces between the frames 60, 110 in multiple directions—the joint 150 primarily in the fore-aft direction and the joint 160 primarily in the up-down direction. These multidirectional joints 150, 160 advantageously enable load sharing between the frames 60, 110 by initially allowing for relative movement in one or more directions therebetween during initial impact until the frames engage one another to interlock and thereafter absorb the impact load by acting as a rigid, unitary structure. The degree to which either or both joints 150, 160 collapses, closes or deforms depends on the direction, severity, and location at which the object is struck by the aircraft 10. The frames 60, 110 share the impact load while maintaining a weatherproof, pressurized cockpit 32.

The configuration of the joints 150, 160 of the present disclosure also helps reduce the cross-sectional area of the frame 60, 110, which no longer need to be designed to absorb the entire impact load. This is advantageous not only for material cost but also because it increases ATOF visibility. Moreover, a larger volume for the pilot ejection envelope from the cockpit 32 is provided, which helps pilot safety during emergency egress.

What have been described above are examples of the present disclosure. It is, of course, not possible to describe every conceivable combination of components or methodologies for purposes of describing the present disclosure, but one of ordinary skill in the art will recognize that many further combinations and permutations of the present disclosure are possible. Accordingly, the present disclosure is intended to embrace all such alterations, modifications and variations that fall within the spirit and scope of the appended claims.

What is claimed is:

1. An apparatus for connecting a windscreen and a canopy to an aircraft, the apparatus comprising:
    a first frame for securing to the windscreen;
    a second frame for securing to the canopy; and
    first and second movable joints connecting the first frame to the second frame, the first and second movable joints deforming in response to an object strike of at least one of the windscreen and the canopy to allow for relative movement between the first and second frames, with the first and second movable joints spacing the first and second frames from one another by a fore-aft gap and a vertically extending gap prior to relative movement between the first and second frames.

2. The apparatus recited in claim 1, wherein the first and second frames moving relative to one another in response to the object strike until the first and second frames abut one another to eliminate at least one of the fore-aft gap and the vertically extending gap and thereafter absorb the impact as a unitary, rigid structure.

3. The apparatus recited in claim 2, wherein the first frame is movable relative to the second frame in the fore-aft direction in response to the object strike.

4. The apparatus recited in claim 2, wherein the second frame is movable relative to the first frame in the vertical direction in response to the object strike.

5. The apparatus recited in claim 1, wherein the first frame includes a shelf for receiving the windscreen and a recess for receiving a projection on the second frame.

6. The apparatus recited in claim 5, wherein the first frame further includes a projection delimiting the recess for engaging the second frame to limit at least one of relative vertical movement and relative fore/aft movement between the first and second frames.

7. The apparatus recited in claim 1, wherein the second frame includes:
    a shelf for receiving the canopy; and
    first and second arms defining a space for receiving the first frame.

8. The apparatus recited in claim 7, wherein the first arm includes a cavity for receiving the first joint such that the first joint deforms in response to relative movement between the first and second frames in a fore-aft direction.

9. The apparatus recited in claim 8, wherein the second arm includes a passage for receiving the second joint such that the second joint deforms in response to relative vertical movement between the first and second frames.

10. The apparatus recited in claim 1, wherein the first joint is deformed in response to the object strike to allow for relative movement between the first and second frames in the fore-aft direction until the first and second frames abut one another to eliminate the fore-aft gap, the second joint being deformed in response to the object strike to allow for relative vertical movement between the first and second frames until the first and second frames abut one another to eliminate the vertically extending gap.

11. The apparatus recited in claim 1, wherein one of the first and second movable joints comprises a seal secured to the second frame and a recessed surface on the first frame which the seal engages, the seal sliding along the recessed surface in response to the object strike to allow for relative fore-aft movement between the first and second frames until the first and second frames abut one another.

12. The apparatus recited in claim 11, wherein the sliding seal is compressed between the second frame and the recessed surface in response to the object strike to allow for relative vertical movement between the first and second frames.

13. The apparatus recited in claim 11, wherein the sliding seal is deformed in response to the object strike to allow for relative movement between the first and second frames in the fore-aft direction until the first and second frames abut one another.

14. The apparatus recited in claim 11, wherein the sliding seal includes a base secured to the second frame, a connecting element for sliding on the recessed surface of the first frame, and resilient arms connecting the seal to the connecting element.

15. The apparatus recited in claim 1, wherein one of the first and second movable joints comprises an inflatable seal secured to the first frame and a cavity provided on the second frame, the inflatable seal being compressed in response to the object strike to allow for relative fore-aft movement between the first and second frames until the first and second frames abut one another.

16. The apparatus recited in claim 15, wherein the inflatable seal comprises:
    a base secured to the first frame;
    a connecting element fixed within the cavity of the second frame, and
    resilient arms connecting the seal to the connecting element.

17. The apparatus recited in claim 16, wherein the base moves towards the connecting element in response to a birdstrike to allow for relative movement between the first and second frames in the fore-aft direction.

18. The apparatus recited in claim 1, wherein:
    the first movable joint comprises a sliding joint including a first seal secured to the second frame and a recessed surface on the first frame on which the first seal slides to allow for relative fore-aft movement between the first and second frames; and
    the second movable joint comprises a compression joint including a second seal secured to the first frame and a cavity provided on the second frame for receiving the second seal to allow for relative fore-aft movement between the first and second frames.

19. The apparatus recited in claim 1, wherein at least one of the first and second movable joints engages at least one of the first and second frames.

20. The apparatus recited in claim 1, wherein at least one of the first and second movable joints engages the first frame and the second frame.

21. An apparatus for connecting a windscreen and a canopy to an aircraft, the apparatus comprising:
    a first frame for securing to the windscreen;
    a second frame for securing to the canopy;
    a sliding joint including a first seal secured to the second frame and a recessed surface on the first frame on which the first seal slides to allow for relative fore-aft movement between the first and second frames; and
    a compression joint including a second seal secured to the first frame and a cavity provided on the second frame for receiving the second seal to allow for relative fore-aft movement between the first and second frames, wherein at least one of the sliding joint and the compression joint deforms in response to an object strike of at least one of the windscreen and the canopy to allow for relative movement between the first and second frames until the first and second frames abut one another.

22. The apparatus recited in claim 21, wherein the sliding joint and the compression joint space the first and second frames from one another prior to relative movement between the first and second frames.

23. The apparatus recited in claim 21, wherein at least one of the sliding joint and the compression joint engages at least one of the first and second frames.

24. The apparatus recited in claim 21, wherein at least one of the sliding joint and the compression joint engages the first frame and the second frame.

\* \* \* \* \*